W. FOY.
COMBINED CULTIVATOR AND SEEDER.
APPLICATION FILED SEPT. 30, 1909.
965,702.
Patented July 26, 1910.
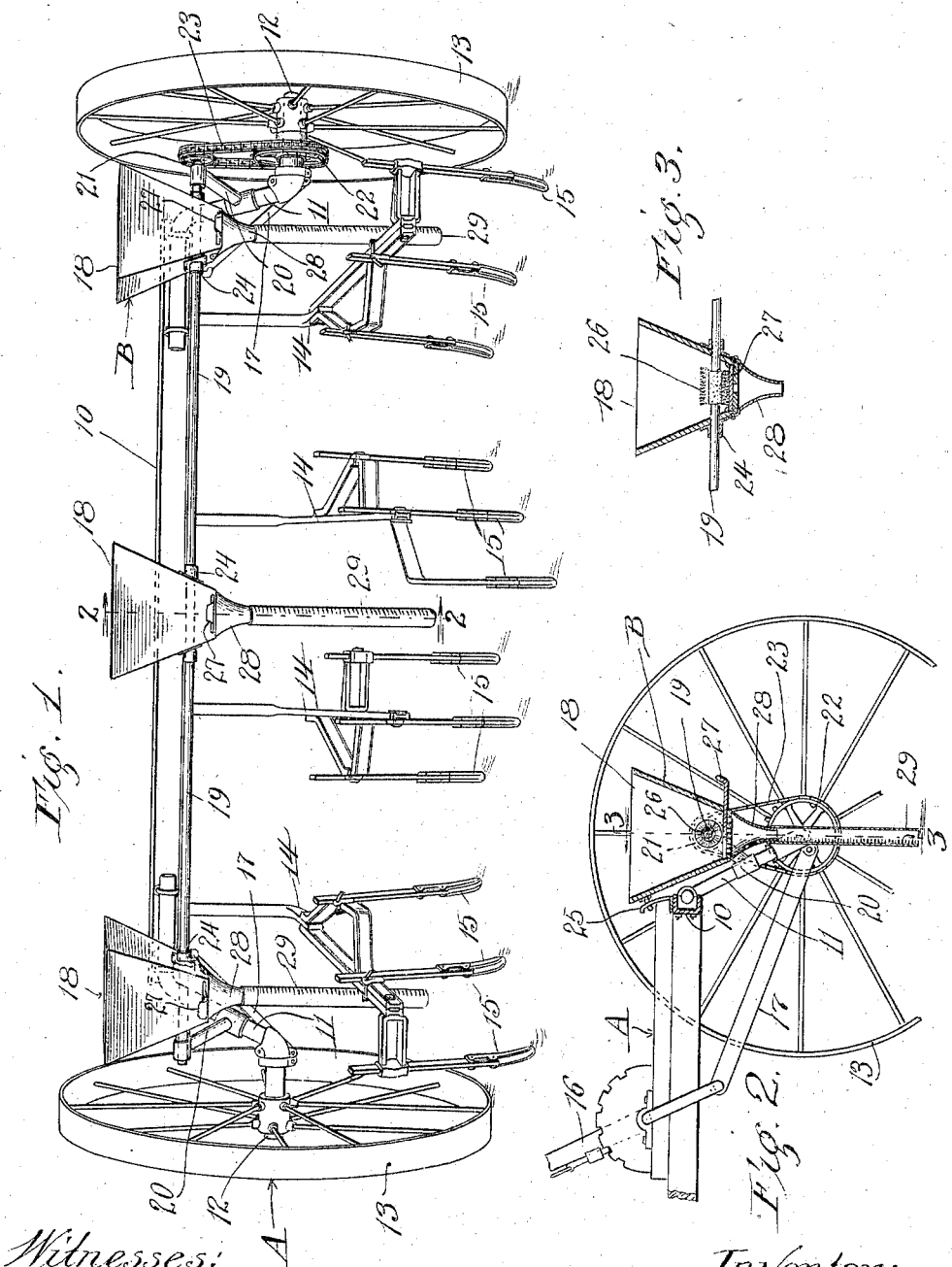
Witnesses:
Fannie F. Richards
George C. Otto
Inventor:
William Foy,
by Charles O. Shurvey
His Atty.

UNITED STATES PATENT OFFICE.

WILLIAM FOY, OF SYCAMORE, ILLINOIS.

COMBINED CULTIVATOR AND SEEDER.

965,702.  Specification of Letters Patent.  Patented July 26, 1910.

Application filed September 30, 1909. Serial No. 520,285.

*To all whom it may concern:*

Be it known that I, WILLIAM FOY, a citizen of the United States, residing at Sycamore, in the county of Dekalb and State of Illinois, have invented new and useful Improvements in Combined Cultivators and Seeders, of which the following is a specification.

This invention relates to improvements in combined cultivators and seeders, the object of the invention being to provide a cultivator of ordinary form with a seeding attachment whereby the machine may be used in seeding the ground midway between the rows simultaneously with the cultivation of the corn.

Many farmers find it advantageous to sow rape, turnip or other small seed between the rows of corn at or about the time of the last cultivation of the corn. This has been done by hand heretofore and is a laborious task and very inconvenient. My invention has been designed to enable the farmer to sow the seed while cultivating the corn.

To such ends this invention consists in a cultivator having a frame, supporting wheels and cultivator blades, in combination with one or more seeding devices arranged to drop the seed between the rows of corn and in the path of the cultivator blades, as the cultivator is being drawn through the field in cultivating the corn.

It further consists in the several novel features of construction, arrangement and combination of parts set forth in the following specification and particularly defined in the claim appended thereto.

The invention is clearly illustrated in the drawings furnished herewith, in which—
Figure 1 is a rear view of a corn cultivator showing my seeding attachment applied thereto, Fig. 2 is a vertical cross section taken through one of the seeding devices, the line of section being indicated at 2—2 in Fig. 1 and Fig. 3 is a vertical section on the line 3—3 of Fig. 2.

Referring to these drawings, A, is a corn cultivator of ordinary construction having the usual arch bar 10, axle arms 11, and axles 12, upon which are journaled the supporting wheels 13. Connected with the frame are the drag bars 14, which support the usual cultivator blades 15. In the form shown in the drawings, the drag bars and blades are arranged for cultivating two rows of corn, and the invention may be applied either to a machine of this type or to a machine which is arranged to cultivate a great number of rows or only one at the time. As is well known, the machine is driven across the field so that the cultivator blades pass on both sides of a row of corn and stir up the ground adjacent thereto. In the form of cultivator illustrated in the drawing, the axle arms are pivoted to the arch bar and secured in place by levers 16, and links 17, whereby the position of the axles with respect to the frame may be adjusted at will. This construction is, however, immaterial to my invention, as any form of cultivator may be used in place of the one illustrated in the drawings.

The seeding attachment is illustrated at B, and comprises in general, one or more seed boxes 18, in which the seed is carried and mechanism for delivering the seed upon the ground. The seeding mechanism is arranged to deliver the seed approximately midway between the rows of corn. A shaft 19, is journaled in arms 20, that are shown as carried by the axle arms 11, and upon one end of said shaft 19, is a sprocket wheel 21, which is connected to a sprocket wheel 22, by a sprocket chain 23. The sprocket wheel 22, is rotatively connected with one of the supporting wheels 13, so that as the machine is being drawn along the ground, a rotary motion will be transmitted to the shaft 19, through the instrumentality of the sprocket wheels and chain. The shaft 19, is shown as extending through the seed boxes 18, and bearings 24, have been provided for the shaft at the points where it passes through the seed boxes. The seed boxes may also be connected to the frame of the machine by brackets or other connecting devices 25. Within the seed boxes the shafts carry means for agitating the seed and insuring its discharge from the boxes, said means being here shown as comprising brushes 26. The bottom of each seed box is perforated for the escape of the seed, and I have shown a slide plate 27, that may be adjusted so as to cover more or less of the perforations in the bottom of the seed boxes to regulate the flow of seed. A spout 28, extends down from the bottom of each seed box to which is connected a delivery tube 29, preferably made of flexible material for delivering the seed upon the ground. The tubes are arranged to deliver the seed approximately midway between the rows of corn, in front of and to the outer side of each gang of cultivator blades, so that the seed may not be thrown toward the rows of corn but will be left approximately midway between them.

In operation the cultivator is used in the ordinary manner in cultivating corn. When the corn is to be cultivated for the last time, the seed boxes are filled with the seed to be sown and the slide plates set so that the proper amount of seed per acre will be delivered to the ground. Where the device is used upon "single row" cultivators, two seed tubes are used and either valve may be left open, but where a "two row" cultivator is employed, three seed tubes are used and one of the end valves is closed while driving across the field in one direction, which valve is opened and the other end valve closed while driving back. This is done to avoid double seeding in one row. The tubes deliver the seed approximately midway between the rows of corn, the blades of the cultivator operate to stir up the ground around the corn as usual, and the ones adjacent the delivery tubes operate simultaneously to cover the seed sown by the attachment so that they perform the two functions of cultivating the corn and covering the seed sown by the seeding attachment.

I am aware that various alterations and modifications of this device are possible without departing from the spirit of my invention, and I do not therefore desire to limit myself to the exact form of construction and arrangement shown and described.

I claim as new and desire to secure by Letters Patent:

The combination with a cultivator having a supporting frame, wheels, and cultivator blades arranged in gangs on either side of the row, of a seeding attachment carried by said frame, and comprising a seed box and a delivering tube extending down therefrom to a point in front of a cultivator blade farthest removed from the row, and arranged to deliver all of the seed midway between the rows, said cultivator blades acting to stir up the ground adjacent the rows and said farthest removed blade acting to cover the seed sown, midway between the rows.

In witness whereof, I have hereunto subscribed my name, at Sycamore, Dekalb county, Illinois, this 25th day of September, A. D. 1909.

WILLIAM FOY.

Witnesses:
A. C. CLIFFE,
WM. J. FULTON.